United States Patent
Goh et al.

(10) Patent No.: US 7,542,411 B1
(45) Date of Patent: Jun. 2, 2009

(54) ECHO PROFILE PROBE

(75) Inventors: Wee Peng Goh, Murrieta, CA (US);
Anton Monk, San Diego, CA (US); Ron Porat, San Diego, CA (US)

(73) Assignee: Entropic Communications Inc., San Diego, CA (US)

( * ) Notice: Subject to any disclaimer, the term of this patent is extended or adjusted under 35 U.S.C. 154(b) by 619 days.

(21) Appl. No.: 11/229,297

(22) Filed: Sep. 16, 2005

Related U.S. Application Data

(60) Provisional application No. 60/633,257, filed on Dec. 3, 2004.

(51) Int. Cl.
*H04J 9/00* (2006.01)
(52) U.S. Cl. .................... 370/208; 370/252; 375/260
(58) Field of Classification Search ......... 370/204–208, 370/252, 254, 230, 235–238; 375/260, 261, 375/267, 320
See application file for complete search history.

(56) References Cited

U.S. PATENT DOCUMENTS

| | | | |
|---|---|---|---|
| 6,487,241 B1* | 11/2002 | Cole | 375/220 |
| 6,856,683 B1* | 2/2005 | Murphy et al. | 379/390.1 |
| 6,876,675 B1* | 4/2005 | Jones et al. | 370/509 |
| 7,123,580 B2* | 10/2006 | Tang et al. | 370/210 |
| 7,292,647 B1* | 11/2007 | Giannakis et al. | 375/295 |
| 2004/0081191 A1* | 4/2004 | Kwon et al. | 370/431 |
| 2006/0013325 A1* | 1/2006 | Agrawal et al. | 375/260 |

* cited by examiner

*Primary Examiner*—Ricky Ngo
*Assistant Examiner*—Dady Chery
(74) *Attorney, Agent, or Firm*—Michael W. Landry; Bruce W. Greenhaus

(57) ABSTRACT

In an orthogonal frequency division multiplex (OFDM) communication network, a node transmits an echo profile probe to other nodes in the network. The echo profile probe is a message that allows characterization of the unique echo profile through the communication channel between each node pair. The echo profile is used to calculate the cyclic prefix length needed for optimum communication from one node to the other.

3 Claims, 4 Drawing Sheets

ECHO PROFILE PROBE

RELATED APPLICATIONS

This application claims priority from U.S. provisional patent application Ser. No. 60/633,257 filed Dec. 3, 2004 entitled "Echo Profile Probe", incorporated herein by reference.

BACKGROUND

1. Field of Invention

The invention relates to broadband communication networks.

2. Prior Art

Orthogonal Frequency Division Multiplexing (OFDM) is a modulation scheme used in communication systems. It is a technique used in multi-antenna broadband systems since it significantly reduces the complexity of the receiver by providing orthogonal sub-channels.

Multipath effects in OFDM are greatly reduced by adding a cyclic prefix (CP) to each OFDM symbol. The CP acts as a guard interval between successive OFDM symbols. In conventional OFDM systems, a fixed-length CP is used. If the channel delay spread is less than or equal to the CP, inter-symbol interference (ISI) is prevented. When the receiver is moving from one environment to another, this condition may not be met, ISI will occur, and the system will be impaired.

The phase noise in OFDM can cause inter-channel-interference (ICI). The use of a cyclic prefix also reduces ICI.

A drawback to OFDM and the use of a fixed-length CP is the reduction in rate due to the CP overhead. If the fixed length CP is not long enough, system performance deteriorates. If the CP length is too long, spectrum efficiency is reduced.

Zhang et al., "A novel OFDM transmission scheme with length-adaptive Cyclic Prefix", J Zhejiang University SCI, 2004, describes a technique applied to a mobile wireless environment to create a variable length CP in order to counter the aforementioned drawbacks of fixed CP length. The paper describes a system where the CP length is reduced when delay spread is small thus reducing overhead. Conversely, the CP length is increased when delay spread is high and ISI eliminated. The disclosed technique utilizes known symbols in the preamble of each packet transmission or pilot sub-carriers to estimate the channel parameters. The channel parameters are used to determine the RMS delay spread and the resulting CP length needed. The technique is inefficient in slowly changing environments because of the preamble overhead or the pilot symbols present in each transmission. Accuracy in the determination of the channel parameters decreases as the number of pilot symbols is reduced to increase spectrum efficiency. In order to compute the delay spread accurately, a long sequence is needed, but the continual transmission of a long sequence uses bandwidth inefficiently.

SUMMARY OF THE INVENTION

The present invention uses an echo profile probe as part of a technique of determining the channel impulse response (CIR) of a communication channel in order to set appropriate communication parameters including cyclic prefix (CP) length for orthogonal frequency division multiplex (OFDM) communication. Without probing the channel, the CP length would have to be set conservatively and long. The echo profile probe is a known message transmitted by any node to other nodes. The receiving nodes, having a priori knowledge of the probe message, perform a computation on the received message, and determine delay spread and the required CP length to avoid inter-symbol interference (ISI).

When a new node enters a network, the nodes need to determine channel characteristics with each other node. The new node broadcasts the echo profile sequence to each node, and each receiving node returns its computation to the new node. Each node also sends an echo profile to the new node for computation and response. The computations include the determination of the minimum cyclic prefix needed. By minimizing the CP length for each packet transmission, overhead due to the CP is reduced and the bandwidth efficiency and performance of the system is optimized.

The present invention uses a separate message, a probe message, to determine the channel characteristics and thereby determine the optimum CP length, which overcomes a limitation of other adaptive schemes that use constantly transmitted symbols in each packet to determine the channel characteristics. The use of the probe or unique message of this invention allows more symbols to be used for channel characterization, providing increased accuracy in calculating delay spread and required CP length. Because the cable environment is considered nearly static, the probe is sent infrequently thus reducing the overhead required for optimum channel characterization.

DETAILED DESCRIPTION OF THE INVENTION

Figure 1:
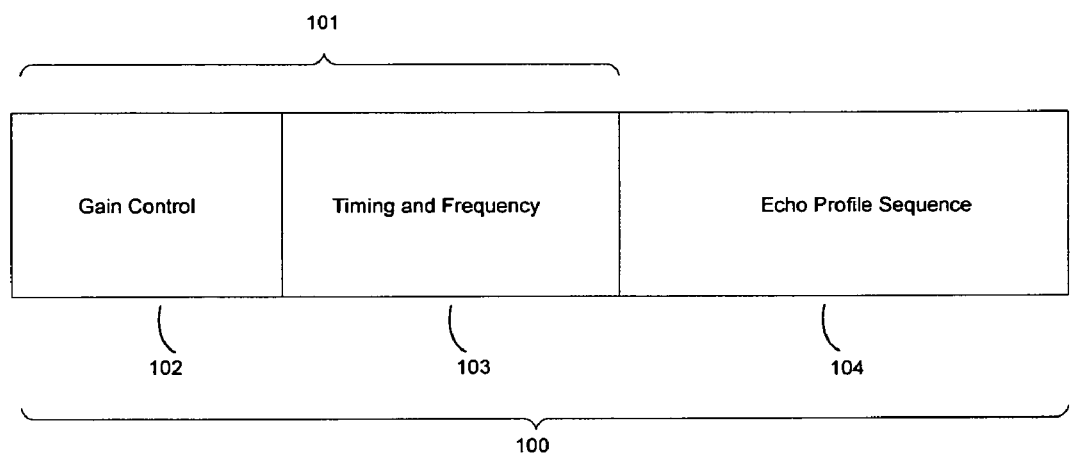
FIG. 1 Echo Profile Probe Structure
FIG. 2 Illustration of Delay Spread
FIG. 3 New Node Entering Network
FIG. 4 Details of Communication between New Node and Existing Node

Referring to FIG. 1, the echo profile probe is a message 100 used to determine the channel impulse response. The message 100 consists of a preamble 101 and a time-domain data payload 104. The preamble contains information for gain control 102, and for timing and frequency-offset adjustments 103. The payload contains the echo profile sequence consisting of 1024 pseudo-random BPSK-modulated bits. This sequence is generated using an m-sequence of degree 10, given by the generator polynomial $2201_8$ with an initial seed of $3FF_{16}$.

In the receiver, the received Echo Profile Sequence (rx) is cross-correlated to a local copy of the same sequence (lseq) as shown in Equation 1.

$$\text{corr\_out} = \sum_{i=0}^{1024} rx(t-i) * lseq(i) \qquad \text{Equation 1}$$

Figure 2:
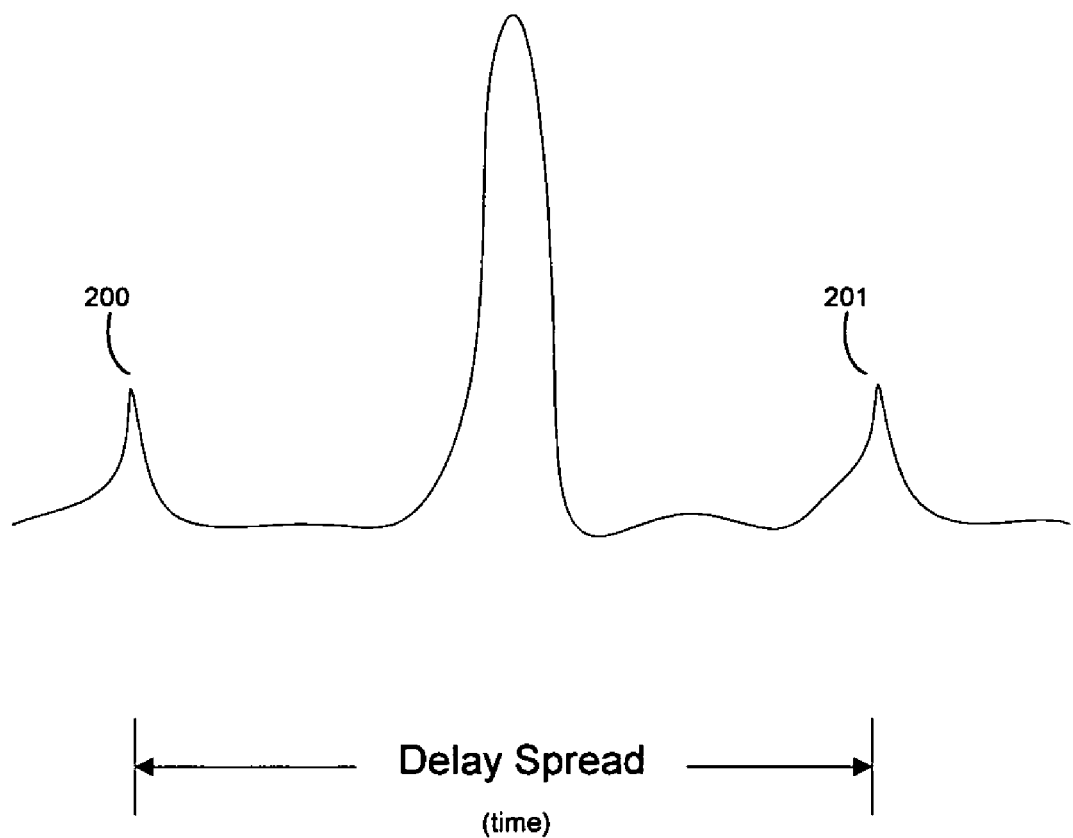

Referring to FIG. 2, the time distance between the earliest significant correlation peak 200 and the latest significant correlation peak 201 is the significant delay spread in the channel response. This delay spread can be used to determine the minimum cyclic prefix that would maintain the orthogonality of the OFDM symbol and eliminate ISI.

The time distance between peaks is determined by further processing of the output of the correlation (corr_out from Equation 1). An example of the processing steps are described below:

Step 1: The peak value of corr_out is determined. This is found using the following pseudo-code and recorded as MAX_PEAK. The time where the MAX_PEAK occurs is recorded as PEAK_TIME.

IF (MAX_PEAK>corr_out) MAX_PEAK=corr_out

Step 2: Look for the first instance of a peak that exceeds a threshold X dB below the peak and record this time as START_PROFILE. X assumes an initial value determined by system analysis for a particular system and is a function of the echo amplitude expected in the channel.

Step 3: Look for the last instance of a peak that exceeds a threshold X dB below the peak and record this time as END_PROFILE.

Step 4: Calculate CP_LEN=END_PROFILE_START_PROFILE.

Step 5: If CP_LEN is greater than CYC_PREFIX_MAX, reduce X by 1 dB and repeat step 2-5 until CP_LEN is smaller than CYC_PREFIX_MAX. CYC_PREFIX_MAX is the maximum cyclic prefix allowed in the data path and equals to 64 in the current embodiment.

Step 6: Reduce X by 1 dB and repeat step 2, 3 and 4. If the CP_LEN is less than R*CYC_PREFIX_MAX (where R is typically a value between 0 and 1) use the newly calculated CP_LEN. Otherwise, use the previously calculated CP_LEN. In this embodiment, step 6 is only done once, but step 6 may also be applied repeatedly with increasingly smaller R until CP_LEN is greater than R*CYC_PREFIX_MAX Step 7: Compute SYSTEM_BIAS_TIME as PEAK_TIME−START_PROFILE.

Step 8: Increase the CP_LEN such that CP_LEN=CP_LEN+DSG_MARGIN. DSG_MARGIN is dependent on implementation, for example 25.

Figure 3:
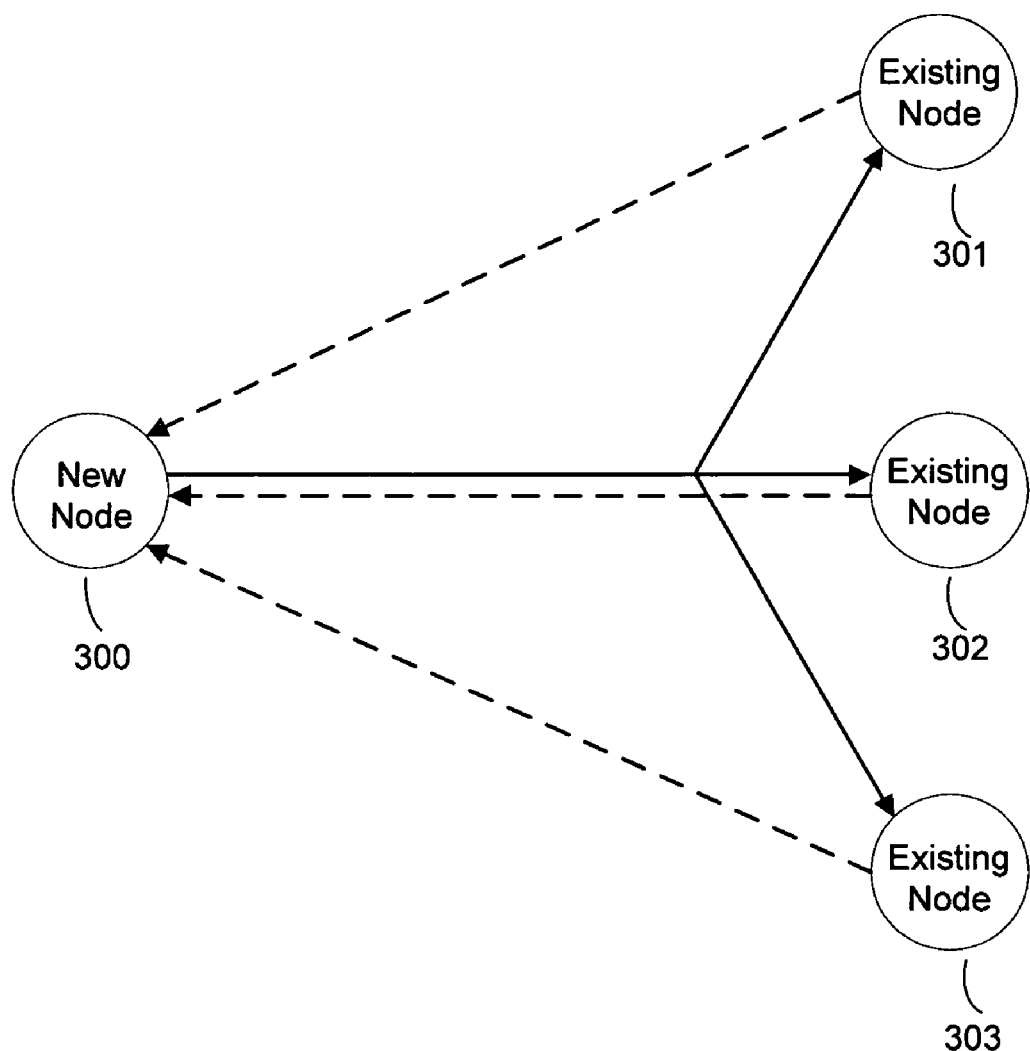

FIG. 3 illustrates the used of the echo profile probe when a new node 300 enters a network with existing nodes 301, 302, and 303. New node 300 broadcasts its echo profile probe to each of the existing nodes. Each of the existing nodes returns results of computations to node 300.

Figure 4:
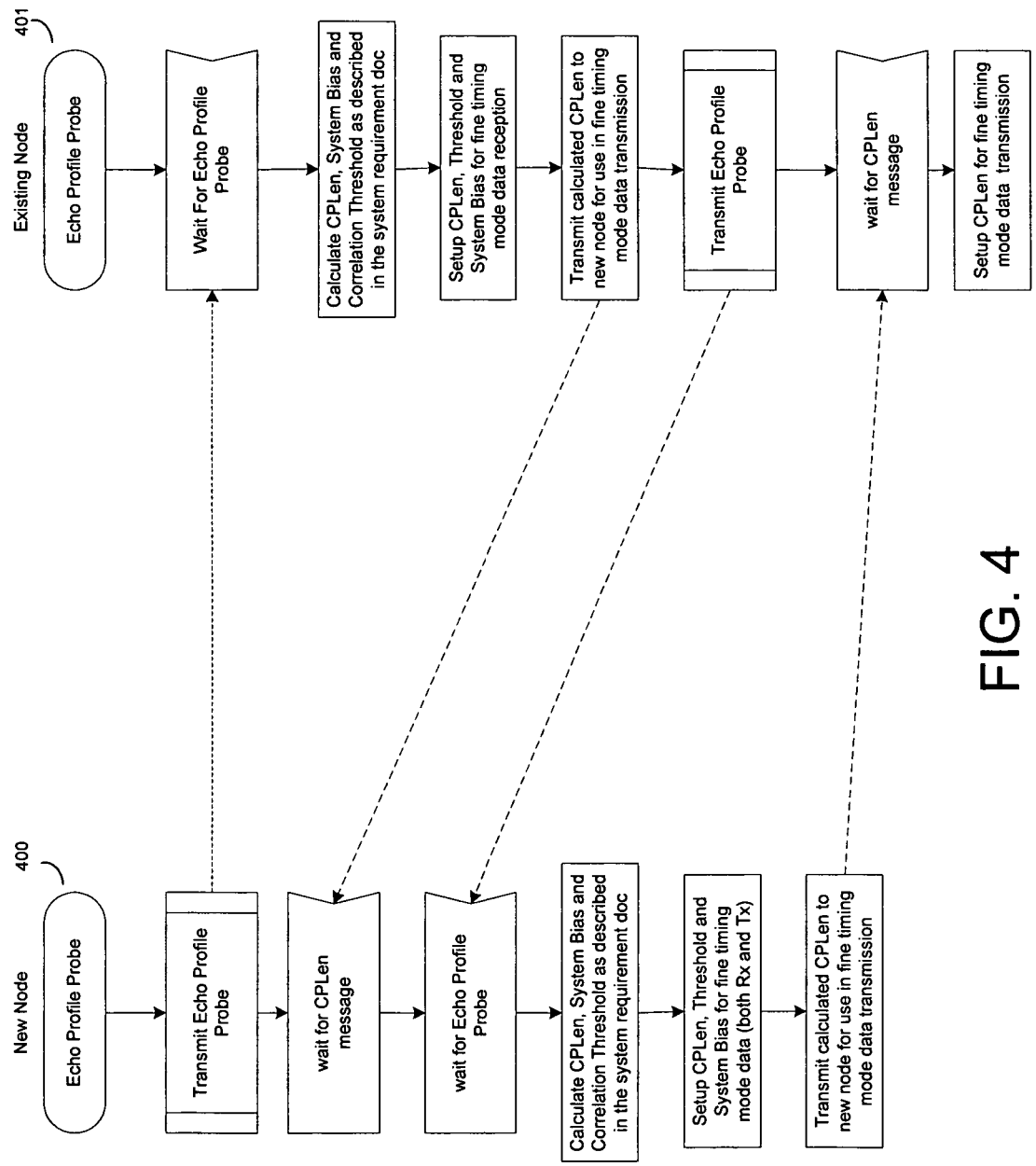

FIG. 4 illustrates the communication between new node 400 and existing node 401. The new node 400 initially transmits its echo profile probe to the existing node 401. The existing node 401 receives the message and performs the necessary computations. The existing node 401 then transmits the calculated cyclic prefix length to the new node 400 followed by the transmission of its echo profile probe. The new node 400 receives the probe and performs the needed calculations, and then sends back to the existing node 401 its calculated cyclic prefix length. Existing node 401 transmits an echo profile probe to new node 400, which performs computations and transmits a cyclic prefix length to existing node 401. The probe message can be sent multiple times and the results averaged for increased accuracy.

In one embodiment of the invention, a cycle master, also called Network Coordinator (NC), controls admission of a new node. A map broadcast by the NC schedules echo profile probe slots along with all other messages. Existing nodes expect a probe message at the slot time designated in the map.

The present invention is suitable for use in a network operating over a communication channel formed by interconnecting nodes with coaxial cable and passive signal splitters.

What is claimed is:

1. A method of communicating using orthogonal frequency division multiplex (OFDM) signaling between a first node and a second node in a communication network comprising the steps of:
sending an echo profile probe from the first node;
receiving the echo profile probe at the second node;
calculating a cyclic prefix length from the received probe message contents;
transmitting the cyclic prefix length from the second node to the first node; and
sending messages from the first node to the second node using the cyclic prefix length;
wherein the communication network comprises nodes interconnected with coaxial cable and passive signal splitters; and
wherein the cyclic prefix length is calculated by determining the channel delay spread wherein echo peaks are identified by cross-correlation between the received echo profile probe and the sent echo profile probe, the channel delay spread is calculated as the delay between echo peaks, then a predetermined design margin value is added to the channel delay spread to produce the cyclic prefix length.

2. The method of claim 1 wherein the echo profile probe is sent according to a map broadcast by a network controller.

3. A method of communicating using orthogonal frequency division multiplex (OFDM) signaling between a first node and a second node in a communication network comprising the steps of:
sending an echo profile probe from the first node;
receiving the echo profile probe at the second node;
calculating a cyclic prefix length from the received probe message contents;
transmitting the cyclic prefix length from the second node to the first node; and
sending messages from the first node to the second node using the cyclic prefix length;
wherein the echo profile probe comprises 1024 pseudo-random BPSK-modulated bits generated using an m-sequence of degree 10 given by the generator polynomial $2201_8$ with an initial seed of $3FF_{16}$.

* * * * *